United States Patent
Owen et al.

(10) Patent No.: US 7,921,413 B2
(45) Date of Patent: Apr. 5, 2011

(54) ARCHITECTURE FOR GENERATING INTERMEDIATE REPRESENTATIONS FOR PROGRAM CODE CONVERSION

(75) Inventors: Daniel Owen, Macclesfield (GB); Jonathan Jay Andrews, Greater Manchester (GB); Miles Philip Howson, Manchester (GB); David Haikney, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/593,442

(22) Filed: Nov. 6, 2006

(65) Prior Publication Data

US 2007/0106983 A1 May 10, 2007

Related U.S. Application Data

(62) Division of application No. 10/730,817, filed on Dec. 8, 2003, now abandoned.

(30) Foreign Application Priority Data

May 2, 2003 (GB) .................................. 0310180.5
Nov. 13, 2003 (GB) .................................. 0326437.1

(51) Int. Cl.
    G06F 9/45 (2006.01)
(52) U.S. Cl. ......... 717/136; 717/143; 717/144; 717/147
(58) Field of Classification Search .................. 717/143, 717/144, 147
    See application file for complete search history.

(56) References Cited

U.S. PATENT DOCUMENTS

| | | | |
|---|---|---|---|
| 5,355,492 A * | 10/1994 | Frankel et al. | 717/151 |
| 5,696,956 A | 12/1997 | Razdan et al. | |
| 5,748,966 A | 5/1998 | Sato | |
| 6,049,667 A * | 4/2000 | Bates | 717/138 |
| 6,097,888 A | 8/2000 | Simonyi | |
| 6,125,439 A | 9/2000 | Tremblay et al. | |
| 6,292,935 B1 | 9/2001 | Lueh et al. | |
| 6,343,373 B1 | 1/2002 | Koizumi et al. | |
| 6,502,236 B1 | 12/2002 | Allen et al. | |
| 6,502,237 B1 | 12/2002 | Yates et al. | |

(Continued)

FOREIGN PATENT DOCUMENTS

EP          0 731 409 A1     9/1996

(Continued)

OTHER PUBLICATIONS

Lattner, et al., "The LLVM Instruction Set and Compilation Strategy", Computer Science Department Technical Report #UIUCDCS-R-2002-2292, University of Illinois at Urbana-Champaign, Aug. 9, 2002.

(Continued)

*Primary Examiner* — Wei Y Zhen
*Assistant Examiner* — Phillip H Nguyen
(74) *Attorney, Agent, or Firm* — Matthew B. Talpis; James L. Baundino

(57) ABSTRACT

An improved architecture for a program code conversion apparatus and method for generating intermediate representations for program code conversion. The program code conversion apparatus determines which types of IR nodes to generate in an intermediate representation (IR) of subject code (10) to be translated. Depending upon the particular subject and target computing environments involved in the conversion, the program code conversion apparatus utilizes either base nodes, complex nodes, polymorphic nodes, and architecture specific nodes, or some combination thereof, in generating the intermediate representation.

15 Claims, 11 Drawing Sheets

U.S. PATENT DOCUMENTS

| | | | |
|---|---|---|---|
| 6,609,248 B1 | 8/2003 | Srivastava et al. | |
| 6,662,356 B1 * | 12/2003 | Edwards et al. | 717/113 |
| 6,880,152 B1 | 4/2005 | Torvalds et al. | |
| 6,895,494 B1 | 5/2005 | Steiss et al. | |
| 6,948,158 B2 | 9/2005 | Van Gageldonk et al. | |
| 7,065,633 B1 | 6/2006 | Yates, Jr. et al. | |
| 7,080,366 B2 | 7/2006 | Kramskoy et al. | |
| 7,234,111 B2 * | 6/2007 | Chu et al. | 715/251 |
| 2002/0042909 A1 | 4/2002 | Van Gageldonk et al. | |
| 2002/0112227 A1 | 8/2002 | Kramskoy et al. | |
| 2002/0129340 A1 | 9/2002 | Tuttle | |
| 2002/0144060 A1 | 10/2002 | Stoodley | |
| 2003/0023958 A1 | 1/2003 | Patel et al. | |
| 2003/0093774 A1 | 5/2003 | Hilton | |
| 2003/0093776 A1 | 5/2003 | Hilton | |
| 2003/0167460 A1 | 9/2003 | Desai et al. | |
| 2004/0015888 A1 | 1/2004 | Fujii et al. | |
| 2004/0044880 A1 | 3/2004 | Altman et al. | |
| 2004/0194070 A1 | 9/2004 | Baraz | |
| 2004/0268330 A1 * | 12/2004 | Grover et al. | 717/146 |
| 2005/0010891 A1 | 1/2005 | Chaiken et al. | |

FOREIGN PATENT DOCUMENTS

| | | |
|---|---|---|
| EP | 1 049 010 A2 | 2/2000 |
| EP | 1 211 598 A1 | 6/2002 |
| EP | 1 380 946 A2 | 1/2004 |
| JP | 4-14144 | 1/1992 |
| JP | 6-250846 | 9/1994 |
| JP | 7-105015 | 4/1995 |
| JP | 11-194948 | 7/1999 |
| JP | 2000-347873 | 12/2000 |
| JP | 2002-527815 | 8/2002 |
| JP | 2002-312180 | 10/2002 |
| JP | 2002-543490 | 12/2002 |
| WO | WO-92/15939 A1 | 9/1992 |
| WO | WO-98/06034 A1 | 2/1998 |
| WO | WO-00/22521 | 4/2000 |

OTHER PUBLICATIONS

European Search Report as issued in Application No. 06112998.7 on Jan. 17, 2007.

Gosling, Java intermediate bytecodes, SIGPLAN Workshop on Intermediate Representations, Jan. 1995, pp. 111-118, vol. 30(3), ACM Press, New York, NY USA.

Smith, Application Development in the ANDF Model, UniForum 1991 Conference Proceedings, Dallas Texas, Jan. 22, 1991, pp. 3-12.

Published Unexamined Utility Model Application (PUUMA) No. JP04-36646(U), published Mar. 27, 1992.

* cited by examiner

Instruction: addi r1,#10
Base Node Representation
Complex Node Representation
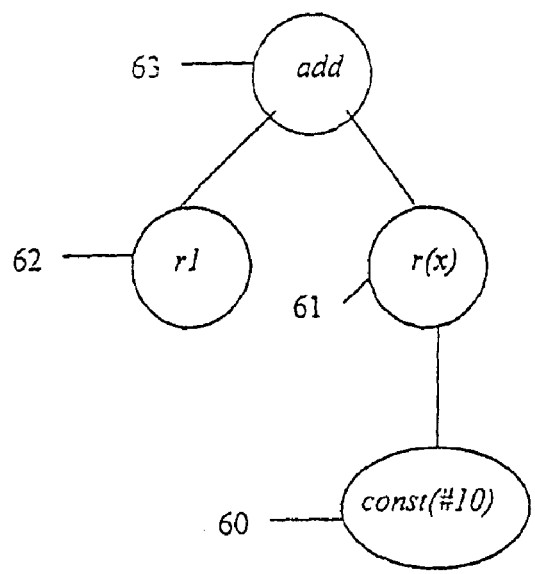
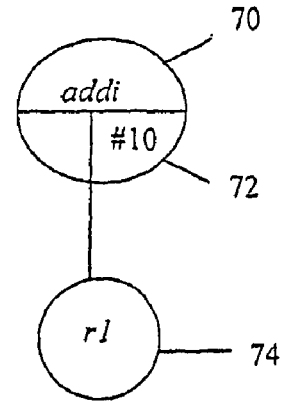
FIG. 6

FIG. 7     MIPS-MIPS ACCELERATOR
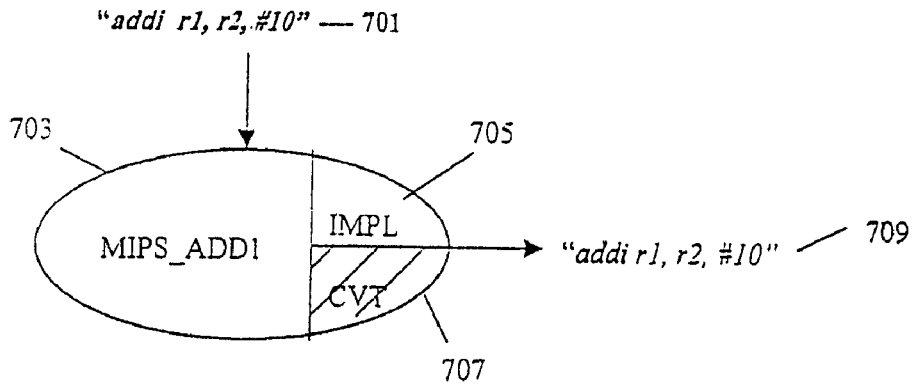
FIG. 8     MIPS-X86 TRANSLATOR
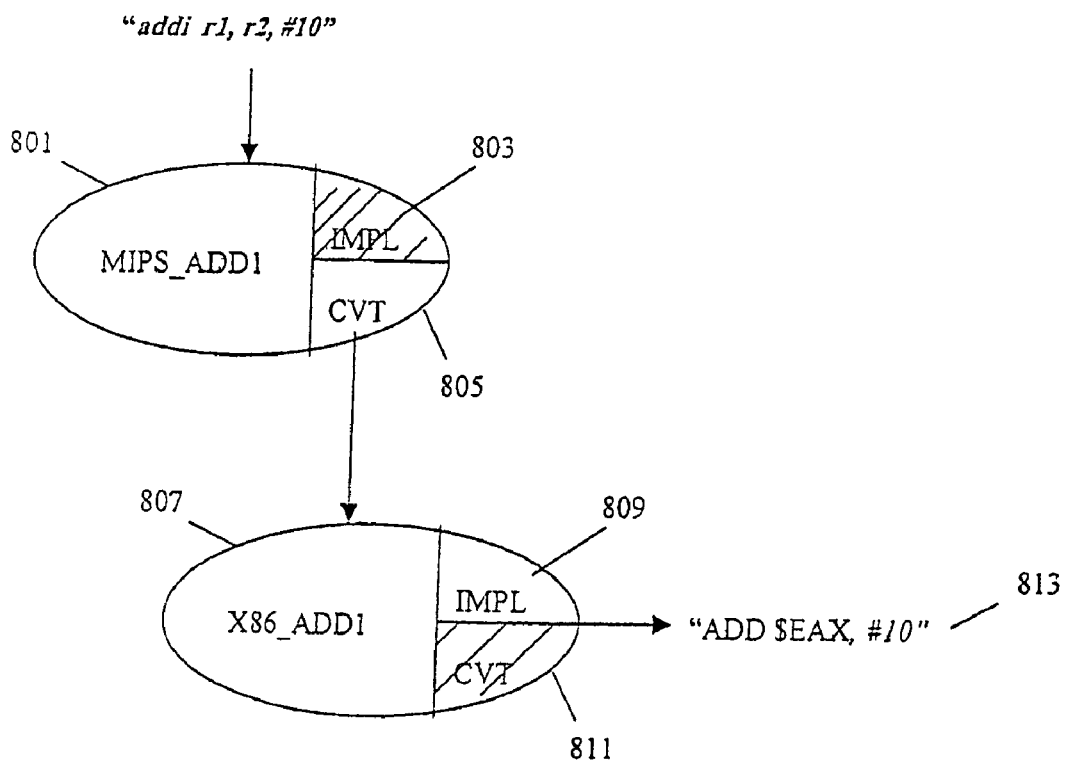

ARCHITECTURE FOR GENERATING INTERMEDIATE REPRESENTATIONS FOR PROGRAM CODE CONVERSION

CROSS REFERENCE TO RELATED APPLICATION

This application is a divisional of prior U.S. patent application Ser. No. 10/730,817, filed Dec. 8, 2003, which is hereby incorporated by reference in its entirety.

BACKGROUND OF THE INVENTION

The subject invention relates generally to the field of computers and computer software and, more particularly, to program code conversion methods and apparatus useful, for example, in code translators, emulators and accelerators.

Across the embedded and non-embedded CPU market, one finds predominant Instruction Set Architectures (ISAs) for which large bodies of software exist that could be "Accelerated" for performance, or "Translated" to a myriad of capable processors that could present better cost/performance benefits, provided that they could transparently access the relevant software. One also finds dominant CPU architectures that are locked in time to their ISA, and cannot evolve in performance or market reach and would benefit from "Synthetic CPU" co-architecture.

It is often desired to run program code written for a computer processor of a first type (a "subject" processor) on a processor of a second type (a "target" processor). Here, an emulator or translator is used to perform program code translation, such that the subject program is able to run on the target processor. The emulator provides a virtual environment, as if the subject program were running natively on a subject processor, by emulating the subject processor.

In the past, subject code is converted to an intermediate representation of a computer program during run-time translation using so-called base nodes, as described in WO 00/22521 entitled Program Code Conversion, in connection with FIGS. 1 through 5 of this application. Intermediate representation "IR" is a term widely used in the computer industry to refer to forms of abstract computer language in which a program may be expressed, but which is not specific to, and is not intended to be directly executed on, any particular processor. Program code conversion methods and apparatus that facilitate such acceleration, translation and co-architecture capabilities utilizing intermediate representations are, for example, addressed in the above-mentioned publication WO 00/22521.

SUMMARY OF THE INVENTION

According to the present invention there is provided an apparatus and method as set forth in the appended claims. Further features of the invention will be apparent from the dependent claims, and the description that follows.

In one aspect of the present invention there is provided a method of translating subject code of a subject architecture into target code of a target architecture. The method comprises decoding the subject code and generating an intermediate representation; and generating target code from the intermediate representation. Also, the method includes the steps of generating a plurality of subject architecture specific nodes which are specific to the subject architecture; converting the subject architecture specific nodes into target architecture specific nodes which are specific to the target architecture; and generating target code instructions from the target architecture specific nodes.

In another aspect of the present invention there is provided a method of translating subject program code capable of being executed on a subject processor architecture to target program code capable of being executed on a target processor architecture using a translator configurable between a plurality of possible subject/target processor architecture pairings, said method comprising: selecting a subject processor architecture on which the subject program code is designed to be executed from a plurality of possible subject processor architectures; selecting a target processor architecture on which the target program code is to be executed from a plurality of possible target processor architectures; and configuring a translator to translate the subject program code to target program code using a pairing of the selected subject processor architecture and the selected target processor architecture.

The following is a summary of various aspects and advantages realizable according to various embodiments of the improved architecture for program code conversion according to the present invention. It is provided as an introduction to assist those skilled in the art to more rapidly assimilate the detailed discussion of the invention that ensues and does not and is not intended in any way to limit the scope of the claims that are appended hereto.

The various embodiments described below relate to improved architectures for a program code conversion apparatus and an associated method for converting subject code executable in a subject computing environment to target code executable in a target computing environment. The program code conversion apparatus creates an intermediate representation ("IR") of the subject code which may then be optimized for the target computing environment in order to more efficiently generate the target code. Depending upon the particular architectures of the subject and target computing environments involved in the conversion, the program code conversion apparatus of one embodiment determines which of the following types of IR nodes to generate in the intermediate representation: base nodes, complex nodes, polymorphic nodes, and architecture-specific nodes. The program code conversion architecture will by default generate base nodes when creating the intermediate representation, unless it is determined that another one of the types of nodes would be more applicable to the particular conversion being effected.

Base nodes provide a minimal set of nodes (i.e., abstract expressions) needed to represent the semantics of any subject architecture running the subject code, such that base nodes provide a RISC-like functionality. Complex nodes are generic nodes that represent CISC-like semantics of a subject architecture running the subject code in a more compact representation than base nodes. While all complex nodes could be decomposed into base node representations with the same semantics, complex nodes preserve the semantics of complex instructions in a single IR node in order to improve the performance of the translator. Complex nodes essentially augment the set of base nodes for CISC-like instructions in the subject code. Base nodes and complex nodes are both generically used over a wide range of possible subject and target architectures, thus allowing generic optimizations to be performed on the corresponding IR trees comprised of base nodes and complex nodes.

The program code conversion apparatus utilizes polymorphic nodes in the intermediate representation when the features of the target computing environment would cause the semantics of the particular subject instruction to be lost if realized as a generic IR node. The polymorphic nodes contain a function pointer to a function of the target computing environment specific to a particular subject instruction in the source code. The program code conversion apparatus further utilizes architecture-specific nodes to provide target-specialized conversion components for performing specialized code generation functions for certain target computing environments.

The improved IR generation methods hereafter described allow the program code conversion apparatus to be configurable to any subject and target processor architecture pairing while maintaining an optimal level of performance and maximizing the speed of translation.

BRIEF DESCRIPTION OF THE DRAWINGS

FIG. 6 shows example IR trees generated using base nodes and complex nodes.

FIG. 7 is a schematic diagram illustrating an example of ASN generation for implementation of the present invention in an accelerator.

FIG. 8 is a schematic diagram illustrating an example of ASN generation for implementation of the present invention in a translator.

DETAILED DESCRIPTION THE INVENTION

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved architecture for a program code conversion apparatus.

Figure 1:
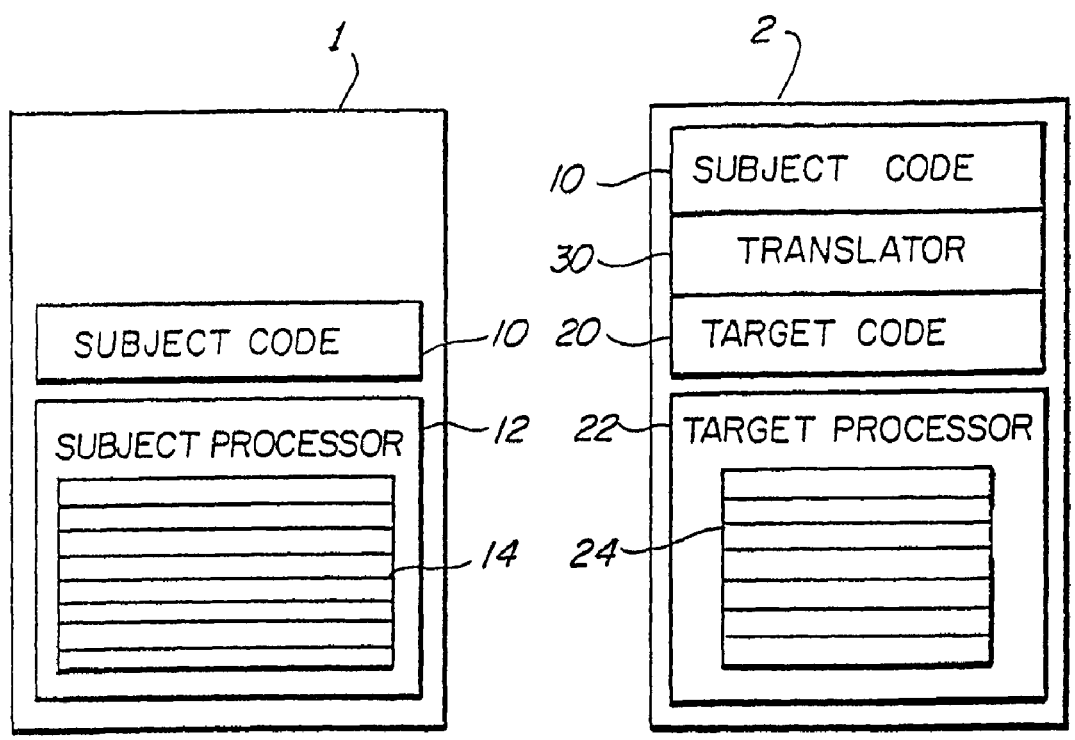
FIG. 1 shows an example computing environment including subject and target computing environments.

Referring to FIG. 1, an example computing environment is shown including a subject computing environment 1 and a target computing environment 2. In the subject environment 1, subject code 10 is executable natively on a subject processor 12. The subject processor 12 includes a set of subject registers 14. Here, the subject code 10 may be represented in any suitable language with intermediate layers (e.g., compilers) between the subject code 10 and the subject processor 12, as will be familiar to a person skilled in the art.

It is desired to run the subject code 10 in the target computing environment 2, which provides a target processor 22 using a set of target registers 24. These two processors 12 and 22 may be inherently non-compatible, such that these two processors use different instruction sets. Hence, a program code conversion architecture 30 is provided in the target computing environment 2, in order to run the subject code 10 in that non-compatible environment. The program code conversion architecture 30 may comprise a translator, emulator, accelerator, or any other architecture suitable for converting program code designed for one processor type to program code executable on another processor type. For the purposes of the discussion of the present invention following hereafter, the program code conversion architecture 30 will be referred to as the "translator 30". It should be noted that the two processors 12 and 22 may also be of the same architecture type, such as in the case of an accelerator.

The translator 30 performs a translation process on the subject code 10 and provides a translated target code 20 for execution by the target processor 22. Suitably, the translator 30 performs binary translation, wherein subject code 10 in the form of executable binary code appropriate to the subject processor 12 is translated into executable binary code appropriate to the target processor 22. Translation can be performed statically or dynamically. In static translation, an entire program is translated prior to execution of the translated program on the target processor. This involves a significant delay. Therefore, the translator 30 preferably dynamically translates small sections of the subject code 10 for execution immediately on the target processor 22. This is much more efficient, because large sections of the subject code 10 may not be used in practice or may be used only rarely.

Figure 2:
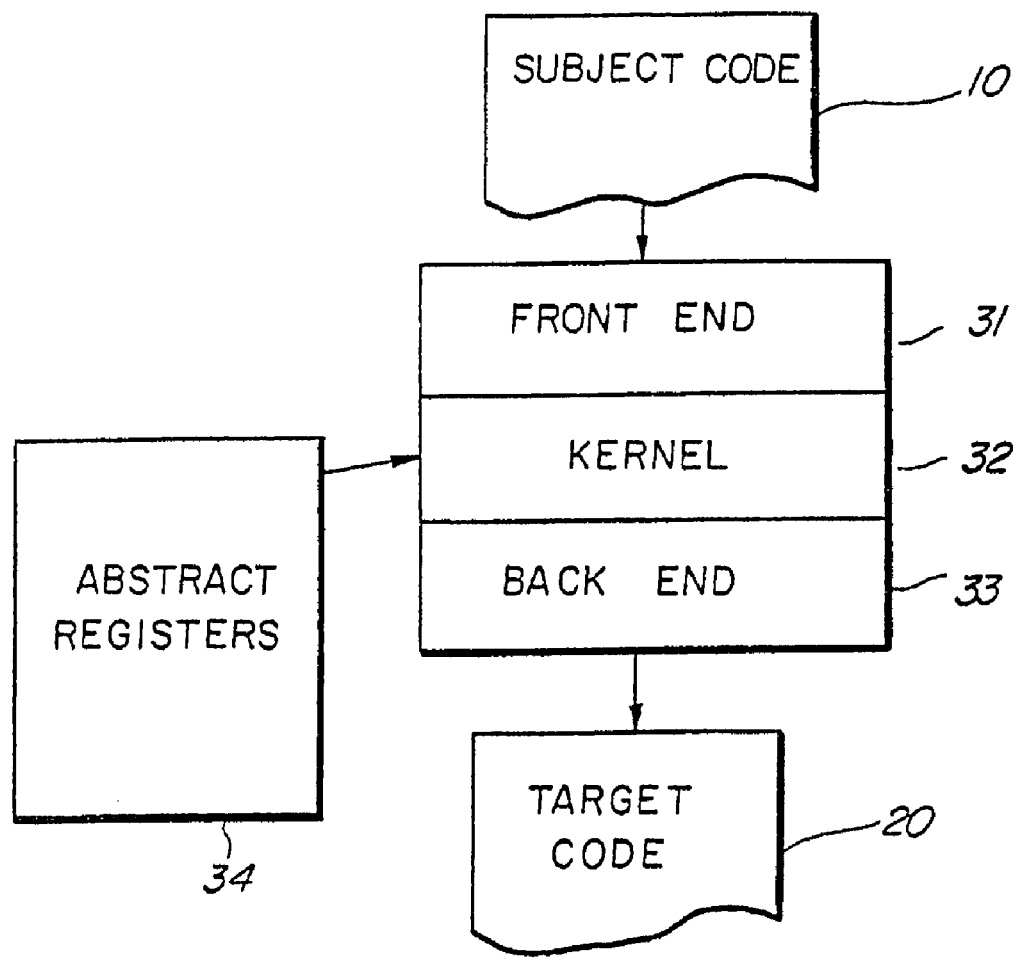
FIG. 2 shows a preferred program code conversion apparatus.

Referring now to FIG. 2, a preferred embodiment of the translator 30 is illustrated in more detail, comprising a front end 31, a kernel 32 and a back end 33. The front end 31 is configured specific to the subject processor 12 associated with the subject code. The front end 31 takes a predetermined section of the subject code 10 and provides a block of a generic intermediate representation (an "IR block"). The kernel 32 optimizes each IR block generated by the front end 31 by employing optimization techniques, as readily known to those skilled in the art. The back end 33 takes optimized IR blocks from the kernel 32 and produces target code 20 executable by the target processor 22.

Suitably, the front end 31 divides the subject code 10 into basic blocks, where each basic block is a sequential set of instructions between a first instruction at a unique entry point and a last instruction at a unique exit point (such as a jump, call or branch instruction). The kernel 32 may select a group block comprising two or more basic blocks which are to be treated together as a single unit. Further, the front end 31 may form iso-blocks representing the same basic block of subject code under different entry conditions. In use, a first predetermined section of the subject code 10 is identified, such as a basic block, and is translated by the translator 30 running on the target processor 22 in a translation mode. The target processor 22 then executes the corresponding optimized and translated block of target code 20.

The translator 30 includes a plurality of abstract registers 34, suitably provided in the kernel 32, which represent the physical subject registers 14 that would be used within the subject processor 12 to execute the subject code 10. The abstract registers 34 define the state of the subject processor 12 being emulated by representing the expected effects of the subject code instructions on the subject processor registers.

Figure 3:
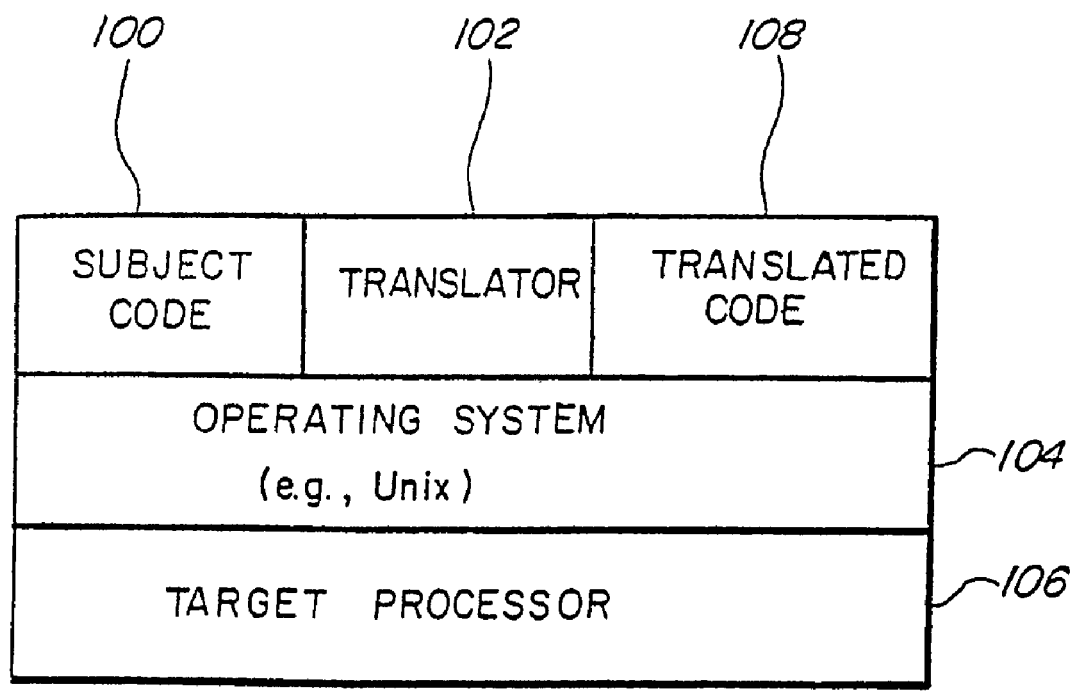
FIG. 3 is a schematic diagram of an illustrative computing environment illustrating translation of subject code to target code.

A structure employing such an implementation is shown in FIG. 3. As shown, compiled native subject code is shown residing in an appropriate computer memory storage medium 100, the particular and alternative memory storage mechanisms being well-known to those skilled in the art. The software components include native subject code to be translated, translator code, translated code, and an operating system. The translator code, i.e., the compiled version of the source code implementing the translator, is similarly resident on an appropriate computer memory storage medium 102. The translator runs in conjunction with the memory-stored operating system 104 such as, for example, UNIX running on the target processor 106, typically a microprocessor or other suitable computer. It will be appreciated that the structure illustrated in FIG. 3 is exemplary only and that, for example, methods and processes according to the invention may be implemented in code residing with or beneath an operating system. The translated code is shown residing in an appropriate computer memory storage medium 108. The subject code, translator code, operating system, translated code and storage mechanisms may be any of a wide variety of types, as known to those skilled in the art.

In a preferred embodiment of the present invention, program code conversion is performed dynamically, at run-time, while the translated program is running in the target computing environment. The translator 30 runs inline with the translated program. The execution path of the translated program is a control loop comprising the steps of: executing translator code which translates a block of the subject code into translated code, and then executing that block of translated code; the end of each block of translated code contains instructions to return control back to the translator code. In other words, the steps of translating and then executing the subject code are interlaced, such that only portions of the subject program are translated at a time.

The translator 30's fundamental unit of translation is the basic block, meaning that the translator 30 translates the subject code one basic block at a time. A basic block is formally defined as a section of code with exactly one entry point and exactly one exit point, which limits the block code to a single control path. For this reason, basic blocks are the fundamental unit of control flow.

Intermediate Representation (IR) Trees

In the process of generating translated code, intermediate representation ("IR") trees are generated based on the subject instruction sequence. IR trees comprise nodes that are abstract representations of the expressions calculated and operations performed by the subject program. The translated code is then generated based on the IR trees. The collections of IR nodes described herein are colloquially referred to as "trees". We note that, formally, such structures are in fact directed acyclic graphs (DAGs), not trees. The formal definition of a tree requires that each node have at most one parent. Because the embodiments described use common subexpression elimination during IR generation, nodes will often have multiple parents. For example, the IR of a flag-affecting instruction result may be referred to by two abstract registers, those corresponding to the destination subject register and the flag result parameter.

For example, the subject instruction (add % r1, % r2, % r3) performs the addition of the contents of subject registers % r2 and % r3 and stores the result in subject register % r1. Thus, this instruction corresponds to the abstract expression "% r1=% r2+%3". This example contains a definition of the abstract register % r1 with an add expression containing two subexpressions representing the instruction operands % r1 and % r2. In the context of a subject program, these subexpressions may correspond to other, prior subject instructions, or they may represent details of the current instruction such as immediate constant values.

When the "add" instruction is parsed, a new 'Y' IR node is generated, corresponding to the abstract mathematical operator for addition. The 'Y' IR node stores references to other IR nodes that represent the operands (held in subject registers, represented as subexpression trees). The 'Y' node is itself referenced by the appropriate subject register definition (the abstract register for % r1, the instruction's destination register). As those skilled in the art may appreciate, in one embodiment the translator is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Abstract Registers

Further, in the embodiment under discussion, IR generation uses a set of abstract registers 34. These abstract registers 34 correspond to specific features of the subject architecture. For example, there is a unique abstract register 34 for each physical register 14 on the subject architecture 12. Abstract registers 34 serve as placeholders for IR trees during IR generation. For example, the value of subject register % r2 at a given point in the subject instruction sequence is represented by a particular IR expression tree, which is associated with the abstract register 34 for subject register % r2. In one embodiment, an abstract register 34 is implemented as a C++ object, which is associated with a particular IR tree via a C++ reference to the root node object of that tree.

In the example instruction sequence described above, the translator 30 has already generated IR trees corresponding to the values of % r2 and % r3 while parsing the subject instructions that precede the "add" instruction. In other words, the subexpressions that calculate the values of % r2 and % r3 are already represented as IR trees. When generating the IR tree for the "add % r1, % r2, % r3 instruction, the new 'Y' node contains references to the IR subtrees for % r2 and % r3.

The implementation of the abstract registers 34 is divided between components in both the translator 30 and the translated code. In the context of the translator, an abstract register is a placeholder used in the course of IR generation, such that the abstract register 34 is associated with the IR tree that calculates the value of the subject register 14 to which a particular abstract register 34 corresponds. As such, abstract registers 34 in the translator may be implemented as a C++ object which contains a reference to an IR node object (i.e., an IR tree). In the context of the translated code, an abstract register 34 is a specific location within the abstract register store, to and from which subject register 14 values are synchronized with the actual target registers 24. Alternatively, when a value has been loaded from the abstract register store, an abstract register 34 in the translated code could be understood to be the target register 26 which temporarily holds a subject register value during the execution of the translated code, prior to being saved back to the register store.

Figure 4:
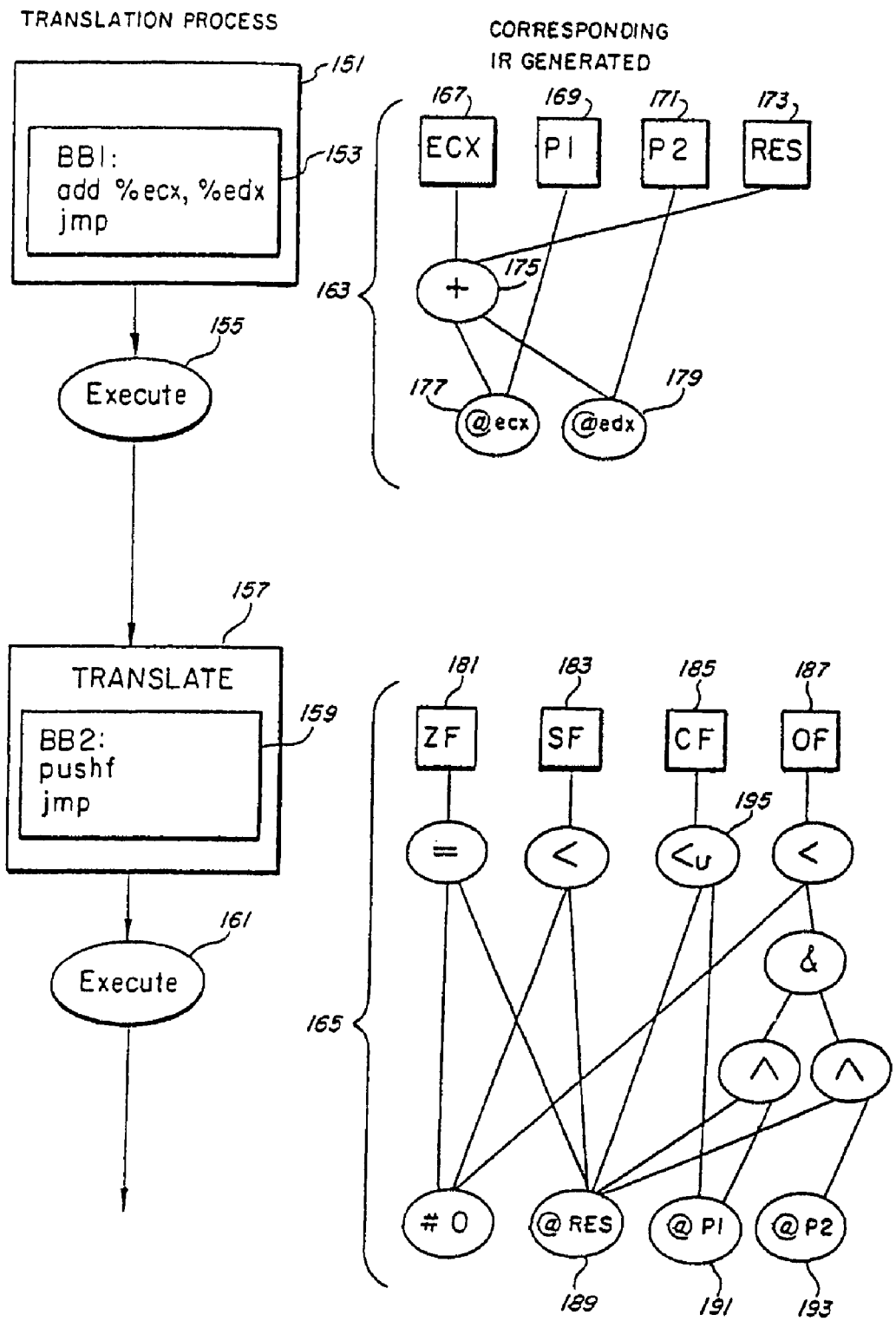
FIG. 4 is a schematic illustration of various intermediate representations realized by a program code conversion apparatus in accordance with a preferred embodiment of the present invention.

An example of program translation as described is illustrated in FIG. 4, which shows the translation of two basic block of x86 instructions, and the corresponding IR trees that are generated in the process of translation. The left side of FIG. 4 shows the execution path of the emulator during translation. The translator 30 translates 151 a first basic block of subject code 153 into target code and then executes 155 that target code. When the target code finishes execution, control is returned to the emulator 157. The translator 30 then translates 157 the next basic block of subject code 159 into target code and executes 161 that target code, and so on.

In the course of translating 151 the first basic block of subject code 153 into target code, the translator 30 generates an IR tree 163 based on that basic block. In this case, the IR tree 163 is generated from the source instruction "add % eex, % edx," which is a flag-affecting instruction. In the course of generating the IR tree 163, four abstract registers are defined by this instruction: the destination subject register % ecx 167, the first flag-affecting instruction parameter 169, the second flag-affecting instruction parameter 171, and the flag-affecting instruction result 173. The IR tree corresponding to the "add" instruction is simply a 'Y' (arithmetic addition) operator 175, whose operands are the subject registers % ecx 177 and % edx 179.

Emulation of the first basic block puts the flags in a pending state by storing the parameters and result of the flag-affecting instruction. The flag-affecting instruction is "add % ecx, % edx". The parameters of the instruction are the current values of emulated subject registers % ecx 177 and % edx 179. The "@" symbol preceding the subject register uses 177, 179 indicate that the values of the subject registers are retrieved from the global register store, from the locations corresponding to % ecx and % edx, respectively, as these particular subject registers were not previously loaded by the current basic block. These parameter values are then stored in the first 169 and second 171 flag parameter abstract registers. The result of the addition operation 175 is stored in the flag result abstract register 173.

After the IR tree is generated, the corresponding target code is generated based on the IR. The process of generating target code from a generic IR is well understood in the art. Target code is inserted at the end of the translated block to save the abstract registers, including those for the flag result 173 and the flag parameters 169, 171, to the global register store. After the target code is generated, it is then executed 155.

In the course of translating 157 the second basic block of subject code 159, the translator 30 generates an IR tree 165 based on that basic block. The IR tree 165 is generated from the source instruction "pushf", which is a flag-using instruction. The semantics of the "pushf" instruction are to store the values of all condition flags onto the stack, which requires that each flag be explicitly calculated. As such, the abstract registers corresponding to four condition flag values are defined during IR generation: the zero flag ("ZF") 181, the sign flag ("SF") 183, the carry flag ("CF") 185, and the overflow flag ("OF") 187. Node 195 is the arithmetic comparison operator "unsigned less-than". The calculation of the condition flags is based on information from the prior flag-affecting instruction, which in this case is the "add % ecx, % edx" instruction from the first basic block 153. The IR calculating the condition flag values 165 is based on the result 189 and parameters 191, 193 of the flag-affecting instruction. As above, the "@" symbol preceding the flag parameter labels indicates that the emulator inserts target code to load those values from the global register store prior to their use.

Thus, the second basic block forces the flag values to be normalized. After the flag values are calculated and used (by the target code emulating the "pushf" instruction), they will be stored into the global register store. Simultaneously, the pending flag abstract registers (parameters and result) are put into an undefined state to reflect the fact that the flag values are stores explicitly (i.e., the flags have been normalized).

Figure 5:
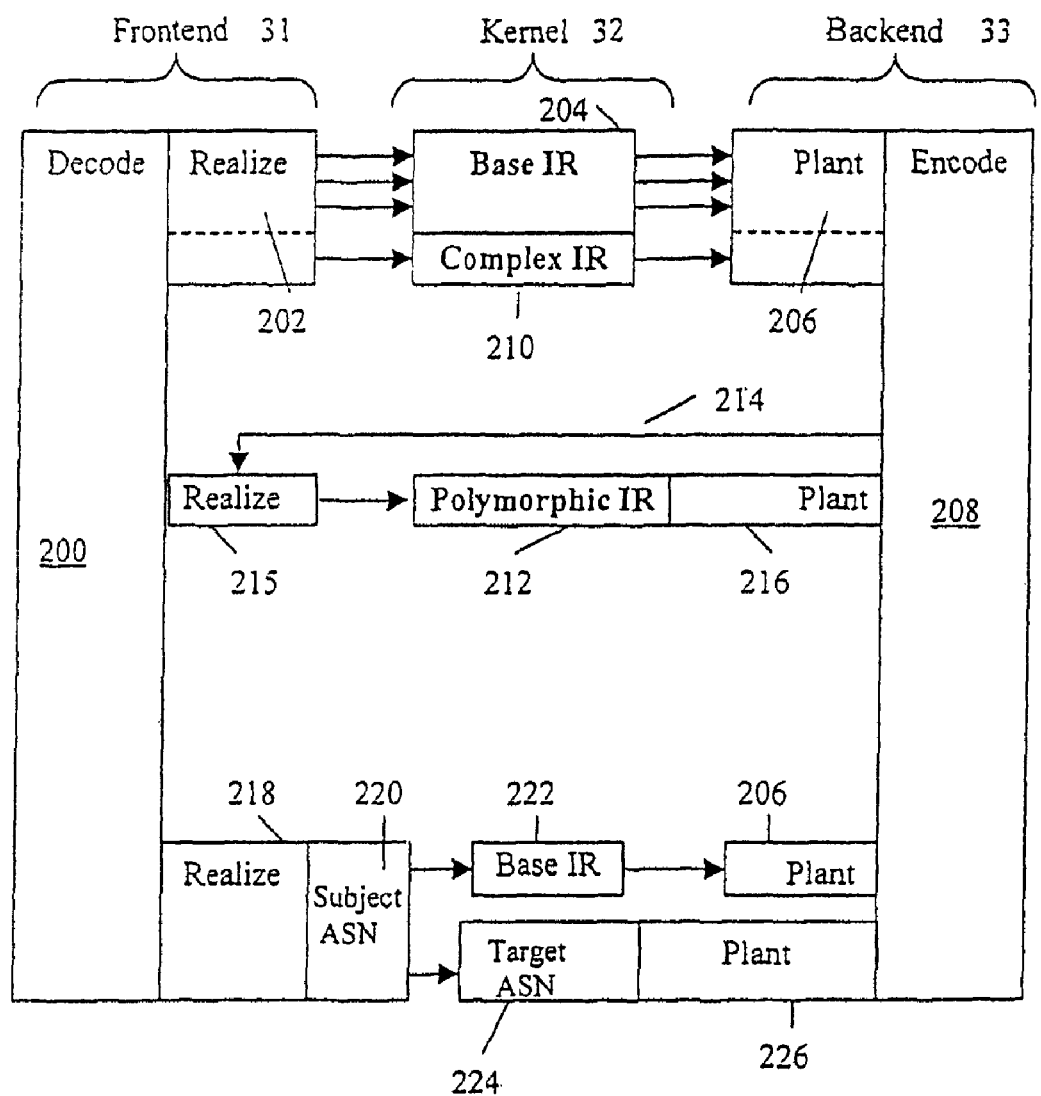
FIG. 5 is a detailed schematic diagram of a preferred program code conversion apparatus.

FIG. 5 shows the translator 30 formed in accordance with a preferred embodiment of the present invention capable of generating several different types of IR nodes that may be used in translation as well as illustrating how the implementations of those different types of IR nodes are distributed between the frontend 31, kernel 32, and backend 33 components of the translator 30. The term "realize" refers to IR generation, which is performed in the frontend 31 as subject instructions of the subject code 10 are decoded (i.e., parsed). The term "plant" refers to target code generation, which is performed in the backend 33.

Note that while the translation process is described below in terms of a single subject instruction, these operations actually take place for an entire basic block of subject instructions at once as described above. In other words, the entire basic block is initially decoded to generate an IR forest, then the kernel 32 applies optimizations to the whole IR forest. Lastly, the backend 33 performs target code generation for the optimized IR forest one node at a time.

When generating an IR forest for a basic block, the translator 30 may generate either base nodes, complex nodes, polymorphic nodes, or architecture specific nodes (ASN), or any combination thereof, depending upon the desired translator performance and the particular architectures of the source processor and target processor pairing.

Base Nodes

Base nodes are abstract representations of the semantics (i.e., the expressions, calculations, and operations) of any subject architecture and provide the minimal set of standard or basic nodes needed to represent the semantics of the subject architecture. As such, base nodes provide simple Reduced Instruction Set Computer (RISC)-like functionality, such as, for instance, an "add" operation. In contrast to other types of nodes, each base node is irreducible, meaning that it cannot be broken down any further into other IR nodes. Due to their simplicity, base nodes are also easily translated by the translator 30 into target instructions on all backends 33 (i.e., target architectures).

When utilizing only base IR nodes, the translation process takes place entirely at the top portion of FIG. 5 (i.e., paths traveling through the "Base IR" block 204). The front-end 31 decodes a subject instruction from the subject program code 10 in decode block 200, and realizes (generates) in realize block 202 a corresponding IR tree made of base nodes. The IR tree is then passed from the front-end 31 to the Base IR block 204 in kernel 32, where optimizations are applied to an entire IR forest. As the IR forest optimized by the Base IR block 204 consists only of base nodes, it is entirely generic to any processor architecture. The optimized IR forest is then passed from the Base IR block 204 in the kernel 32 to the backend 33, which plants (generates) corresponding target code instructions for each IR node in Plant block 206. The target code instructions are then encoded by encode block 208 for execution by the target processor.

As noted above, base nodes are easily translated into target instructions on all backbends 33, and the translated code can typically be generated entirely through exclusive utilization of base nodes. While the exclusive use of base nodes is very quick to implement for the translator 30, it yields suboptimal performance in the translated code. In order to increase the performance of the translated code, the translator 30 can be specialized to exploit features of the target processor architecture by using alternative types of IR nodes, such as complex nodes, polymorphic nodes, and architecture-specific nodes (ASNs).

Complex Nodes

Complex nodes are generic nodes that represent the semantics of a subject architecture in a more compact representation than base nodes. Complex nodes provide a "Complex Instruction Set Computer (CISC)-like" functionality such as "add_imm" (add register and immediate constant), for example. Specifically, complex nodes typically represent instructions with immediate constant fields. Immediate-type instructions are instructions in which a constant operand value is encoded into the instruction itself in an "immediate" field. For constant values that are small enough to fit into immediate fields, such instructions avoid the use of one register to hold the constant. For complex instructions, complex nodes can represent the semantics of the complex instructions with much fewer nodes than equivalent base node representations characterizing the same semantics. While complex nodes can essentially be decomposed into base node representations having the same semantics, complex nodes are useful in preserving the semantics of immediate-type instructions in a single IR node, thus improving the performance of the translator 30. Furthermore, in some situations, the semantics of the complex instructions would be lost by representing the complex instructions in terms of base nodes, and complex nodes thus essentially augment the base node set to include IR nodes for such "CISC-like" instructions.

With reference to FIG. 6, an example of the efficiency achieved by using a complex node as compared to that of base nodes will now be described. For example, the semantics of the MIPS add-immediate instruction "addi r1, #10" adds ten to the value held in register r1. Rather than loading the constant value (10) into a register and then adding two registers, the addi instruction simply encodes the constant value 10 directly into the instruction field itself, thus avoiding the need to use a second register. When generating an intermediate representation of these semantics strictly using base nodes, the base node representation for this instruction would first load the constant value 10 from the const(#10) node 60 into a register node r(x) 61, and then perform an addition of the register node r1 62 and register node r(x) 61 using add node 63. The complex node representation consists of a single "add to immediate" IR node 70 containing the constant value 10 at portion 72 of the node 70 and a reference to register r1 74. In the base node scenario, the backend 33 would need to perform idiom recognition capable of recognizing a four node pattern, shown in FIG. 6, in order to recognize and generate an "add to immediate" target instruction. In the absence of idiom recognition, the backend 33 would emit an extra instruction to load the constant value 10 into a register prior to performing a register-register addition.

Complex nodes reduce the need for idiom recognition in the backend 33, because complex nodes contain more semantic information than their base node equivalents. Specifically, complex nodes avoid the need for backend 33 idiom recognition of constant operands. By comparison, if an immediate type subject instruction were decomposed into base nodes (and the target architecture also contained immediate type instructions), then the translator 30 would either need expensive backend 33 idiom recognition to identify the multiple node cluster as an immediate instruction candidate, or generate inefficient target code (i.e., more instructions than necessary), using more target registers than necessary. In other words, by utilizing base nodes alone, performance is lost either in the translator 30 (through idiom recognition) or the translated code (through extra generated code without idiom recognition). More generally, because complex nodes are a more compact representation of semantic information, they reduce the number of IR nodes that the translator 30 must create, traverse, and delete.

Immediate type instructions are common to many architectures. Therefore, complex nodes are generic in that they are reusable across a range of architectures. However, not every complex node is present in the IR node set of every translator. Certain generic features of the translator are configurable, meaning that when a translator is being compiled for a particular pair of source and target architectures, features that do not apply to that translator configuration can be excluded from compilation. For example, in a MIPS-MIPS (MIPS to MIPS) translator, complex nodes that do not match the semantics of any MIPS instructions are excluded from the IR node set because they would never be utilized.

Complex nodes can further improve the performance of the target code generated using an in-order traversal. In-order traversal is one of several alternative IR traversal algorithms that determines the order in which IR nodes within an IR tree are generated into target code. Specifically, in-order traversal generates target code for each IR node as it is first traversed, which precludes backend 33 idiom recognition due to the absence of a separate optimization pass over the entire IR tree. Complex nodes represent more semantic information per node than base nodes, and thus some of the work of idiom recognition is implicit within the complex nodes themselves. This allows the translator 30 to use in order traversal without suffering much of a penalty in target code performance as it would with base nodes alone.

When the translator 30 generates complex nodes (i.e., the paths travelling through the Complex IR block 210 in FIG. 5), the translation process is similar to the translation process described above for the base nodes. The only difference is that subject instructions that match the semantics of a complex node are realized as complex nodes in Realize block 202 rather than base nodes (as illustrated by the dotted line separating Realize block 202). Complex nodes are still generic across a wide range of architectures, which enables the kernel 32 optimizations to still apply to the entire IR forest. Furthermore, target code generation for complex nodes on CISC type target architectures may be more efficient than the base node equivalents.

Polymorphic Nodes

A preferred embodiment of the translator 30 as illustrated in FIG. 5 may further utilize polymorphic intermediate representation. Polymorphic intermediate representation is a mechanism by which the backend 33 can provide specialized code generation to efficiently utilize target architecture features for specific, performance critical subject instructions. The polymorphic mechanism is implemented as a generic polymorphic node which contains a function pointer to a backend 33 code generation function. Each function pointer is specialized to a particular subject instruction. This polymorphic mechanism preempts the standard frontend 31 IR generation mechanism, which would otherwise decode the subject instruction into base or complex nodes. Without the polymorphic mechanism, the generation of those base nodes would, in the backend 33, either result in suboptimal target code or require expensive idiom recognition to reconstruct the semantics of the subject instruction.

Each polymorphic function is specific to a particular subject instruction and target architecture function pairing. Polymorphic nodes expose minimal information about their function to the kernel 32. Polymorphic nodes are able to take part in normal kernel 32 optimizations, such as expression sharing and expression folding. The kernel 32 can use the function pointer to determine if two polymorphic nodes are the same. Polymorphic nodes do not retain any semantic information of the subject instruction, but such semantic information can be inferred from the function pointer.

Polymorphic nodes are used for subject instructions, which can be expressed by a series of carefully chosen target instructions, removing the need for the kernel 32 to determine the best target instructions are run-time. When polymorphic nodes are not realized by the frontend 31 which uses bases nodes, the kernel 32 may choose to realize these nodes as polymorphic nodes.

Furthermore, polymorphic nodes can contain register allocation hints. As the target instructions are known, the respective registers that may be required on CISC architectures may also be known. Polymorphic nodes allow their operand and results to appear in registers chosen at the time of IR construction.

In order for the translator 30 to utilize polymorphic nodes (i.e., the path traveling through polymorphic IR block 212 in FIG. 5), the backend 33 provides a list of subject instruction target function pointer pairs to the frontend 31. Subject instructions that are on the provided list are realized as polymorphic nodes containing the corresponding backend 33 function pointer. Subject instructions that are not on the list are realized as complex or base IR trees as discussed above. In FIG. 5, the path reflected by the arrow 214 from the backend 33 to the frontend 31 shows the list of subject instruction target function pointer pairs being provided to the realize block 215 at the frontend 31. While the frontend 31 performs realization in the realize block 215 (i.e., mapping of subject instructions to IR nodes), the process is modified by information received from the backend 33 through path 214.

In the polymorphic IR block 212 of the kernel 32, polymorphic nodes can still participate in generic optimizations, because the kernel 32 can infer their semantics from the function pointers in each node. In the backend 33, the target function pointers which point to target code generation functions are simply dereferenced and executed. This situation is different from the base node and complex node cases where the backend 33 maps particular IR nodes to particular code generation functions. With polymorphic nodes, the polymorphic function is encoded directly in the node itself, so that the backend 33 performs less computation. In FIG. 5, this difference is shown by the fact that the polymorphic plant block 216 is contiguous with both the polymorphic IR block 212 and the backend 33 (i.e., no arrows designating nontrivial computations are shown between the polymorphic IR block 212 and the polymorphic plant block 216).

Example 1

Polymorphic IR Example

To illustrate the process of optimizing the translator 30 for utilizing polymorphic nodes in the IR, the following example describes the translation of a PPC (PowerPC "SHL64") instruction (left shift, 64 bit) required in a PPC-P4 (PowerPC to Pentium4) translator using first base nodes and then polymorphic nodes.

Without optimizing the translator for the implementation of polymorphic nodes, the translation of the PPC SHL64 instruction would use only base nodes:

PPC SHL64=>Base IR multiple nodes=>P4 multiple instructions

The frontend decoder 200 of an unoptimized translator decodes the current block and encounters the PPC SHL64 instruction. Next, the frontend realize block 202 instructs the kernel 32 to construct an IR consisting of multiple base nodes. Then the kernel 32 optimizes the IR forest (generated from the current block of instructions) and performs an in-order traversal. Next, the kernel 32 performs code generation for each IR node, instructing the backend 33 to plant appropriate RISC type instructions. Finally, the backend 33 plants code in plant block 206 and encodes each RISC type instruction with one or more target architecture instructions in encode block 208.

When optimized for a specific target architecture by specialization of the frontend 31 and backend 33 for performance critical instructions:

PPC SHL64=>Poly IR single node=>P4 single/few instructions

The frontend decoder 200 of the optimized translator 30 decodes the current block and encounters the PPC SHL64 instruction. Next, the frontend realize block 202 instructs the kernel 32 to construct an IR consisting of a single polymorphic IR node. When the single polymorphic node is created, the backend 33 knows that the shift operand of SHL64 must be in a specific register (% ecx on P4). This requirement is encoded in the polymorphic node. Then the kernel 32 optimizes the IR forest for current block and performs an in-order traversal to fix the code generation order in the polymorphic IR block 212. Next, the kernel 32 performs code generation for each node, instructing the backend 33 to plant appropriate RISC type instructions. During code generation, however, polymorphic nodes are treated differently than base nodes. Each polymorphic node causes the invocation of a specialized code generator function which resides in the backend 33. The backend 33 specialized code generator function plants code in plant block 216 and encodes each subject architecture instruction with one or more target architecture instructions in encode block 208. During register allocation in the generation phase, the specific register information is used to allocate the correct register. This reduces the computation performed by the backend 33 which would be required if unsuitable registers had been allocated. This code generation may involve register allocation for temporary registers.

Example 2

Difficult Instructions

The following example illustrates the translation and optimization of the PPC MFFS instruction (move 32 bit FPU control register to 64 bit general FPU register) which would be performed by the translator 30 of the present invention. This subject instruction is too complex to be represented by base nodes.

In the unoptimized case, this instruction would be translated using a substitute function. Substitute functions are explicit translations for special cases of subject instructions that are particularly difficult to translate using the standard translation scheme. Substitute function translations are implemented as target code functions that perform the semantics of the subject instruction. They incur a much higher execution cost than the standard IR instruction based translation scheme. The unoptimized translation scheme for this instruction is thus:

PPC MFFS instruction=>Base IR substitute function=>P4 substitute function

In a translator 30 using polymorphic IR, such special case instructions are translated using a polymorphic node. The polymorphic node's function pointer provides a more efficient mechanism for the backend 33 to supply a custom translation of the difficult subject instruction. The optimized translation scheme for the same instruction is thus:

PPC MFFS instruction=>single Polymorphic IR node=>P4 SSE2 instructions

Architecture Specific Nodes

In another preferred embodiment of the translator 30 of the present invention, the translator 30 may utilize architecture specific nodes (ASNs), as shown in FIG. 5, which are specific to particular architectures (i.e., a particular source architecture target architecture combination). Each architecture specific node (ASN) is specifically tailored to a particular instruction, thus rendering ASNs specific to particular architectures. When utilizing the ASN mechanism, architecture specific optimizations can be implemented which comprehend the ASNs' semantics and can therefore operate on the ASNs.

IR nodes may contain up to three components: a data component, an implementation component, and a conversion component. The data component holds any semantic information which is not inherent in the node itself (e.g., the value of a constant immediate instruction field). The implementation component performs code generation, and, therefore, is specifically related to a particular architecture. The conversion component converts the node into IR nodes of a different type, either ASN nodes or base nodes. In a given implementation of the present invention in a translator, each base node and ASN in the generated IR contains either a conversion component or an implementation component, but not both.

Each base node has an implementation component which is specific to the target architecture. Base nodes do not have conversion components, because base nodes encode the least possible amount of semantic information in the IR node hierarchy, thus converting base nodes into other types of IR nodes would not provide any benefit. Any such conversion of base nodes into other types of IR nodes would require the recollection of semantic information through idiom recognition.

The implementation component of an ASN is specific to the node's architecture, such that it generates an architecture specific instruction corresponding to that ASN. For example, the implementation component of a MIPSLoad ASN generates a MIPS "ld' (load) instruction. When using the translator of the present invention with the same subject and target architectures (i.e., as an accelerator), subject ASNs will possess implementation components. When utilizing the translator with different subject and target architectures, subject ASNs will have conversion components.

For example, FIG. 7 illustrates the ASN for a MIPS instruction when using an embodiment of the present invention in a MIPS-MIPS accelerator. The frontend 31 decodes the MIPS "addi" (add immediate) instruction 701 and generates an IR to include the corresponding ASN, MIPS_ADDI 703. The subject and target architectures are the same for an accelerator, and thus the conversion component "CVT" 707 is undefined. The implementation component "IMPL" 705 is defined to generate the same MIPS "addi" instruction 709, subject to register allocation differences in the code generation pass.

FIG. 8 illustrates the ASNs in the IR for the same MIPS instruction when using an embodiment of the present invention in a MIPS-X86 translator. The frontend 31 decodes the MIPS "addi" subject instruction and generates a corresponding subject ASN, MIPS_ADDI 801. The source and target architectures are different for this translator, and the implementation component 803 of the subject ASN 801 is thus undefined. The conversion component 805 of the MIPS_ADDI is a specialized conversion component, which converts the subject ASN 801 into a target ASN 807. By comparison, a generic conversion component would convert the subject ASN 801 into a base node representation. The target ASN representation of the MIPS ADDI node 801 is a single X86 ADDI node 807. The conversion component 811 of the target ASN 807 is undefined. The implementation component 809 of the target ASN 807 generates the a target instruction 813, in this case the X86 instruction "ADD $EAX, #10."

When the translator 30 is utilizing ASNs, all subject instructions are realized as subject specific ASNs. In FIG. 5, the fact that the frontend decode block 200, the ASN realize block 218, and the subject ASN block 220 are contiguous with each other represents the fact that the ASNs are defined by the frontend 31 and that realization is trivial, because there is a one to one relationship between subject instruction types and subject ASNs types. The frontend 31 contains subject specific optimizations which understand the semantics of, and can operate on, subject ASNs. In other words, the subject code is initially realized as an IR forest consisting entirely of subject ASNs, to which subject specific optimizations are then applied.

By default, a subject ASN has a generic conversion component which generates an IR tree of base nodes. This allows support for a new subject architecture to be implemented quickly using generic IR nodes. Subject ASNs are realized as base nodes through the path extending through the ASN Base IR block 222 and plant block 206 in FIG. 5, which are translated into target code in a similar manner to other base nodes as described in detail above.

For subject instructions that are significant to performance, the corresponding subject ASN nodes provide specialized conversion components, which generate IR trees of target ASN nodes. Factors considered in whether to implement a specialized conversion component include (1) whether the target architectural features provide for particularly efficient translation that would be lost in a base node translation and (2) whether a subject instruction occurs with such frequency that it has a significant impact on performance. These specialized conversion components are specific to the subject target architecture pair. Target ASNs (which by definition have the same architecture as the target) include implementation components.

When implementing the specialized conversion components, the corresponding subject ASN nodes provide target specialized conversion components which convert the subject ASNs into target ASNs through the target ASN block 224. The target ASN's implementation component is then invoked to perform code generation in the target ASN plant block 226. Each target ASN corresponds to one particular target instruction, such that the code generated from a target ASN is simply the corresponding target instruction that the ASN encodes. As such, code generation using target ASNs is computationally minimal (represented in reflected in FIG. 5 by the illustration of the target ASN plant block 226 being contiguous with both the target ASN block 224 and the encode block 208 in the backend 33, with no arrows designating nontrivial computations being shown between these components). Furthermore, the IR traversal, conversion, and code generation processes are all controlled by the kernel 32.

Figure 9:
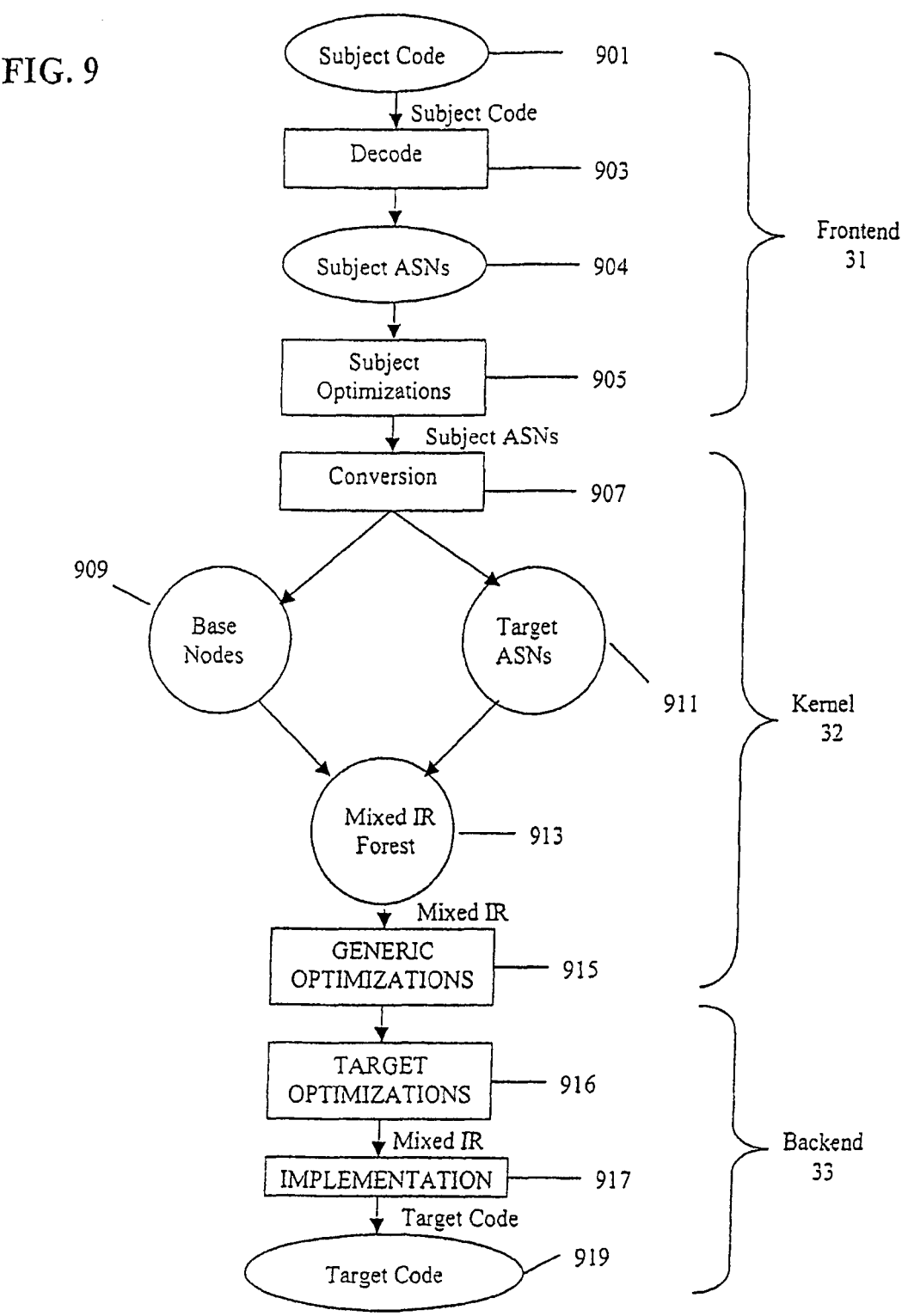
FIG. 9 is an operational flow diagram of the translation process when utilizing ASNs in accordance with a preferred embodiment of the present invention.

FIG. 9 illustrates the translation process performed in accordance with a preferred embodiment of the translator of the present invention that utilizes the ASN mechanism. In the frontend 31, the translator decodes the subject code 901 in step 903 into subject ASNs 904. The translator performs subject specific optimizations in step 905 on the IR tree made up of subject ASNs. Each subject ASN 904 is then converted in step 907 into target compatible IR nodes (target ASNs 911) by invoking the subject ASN's conversion component. Subject ASN nodes which have generic conversion components by default are converted into base nodes 909. Subject ASN nodes which have specialized conversion components, as provided by the backend 925, are converted into target ASNs 911. The conversion thus produces a mixed IR forest 913, containing both base nodes 909 and target ASNs 911. In the kernel 32, the translator performs generic optimizations in step 915 on the base nodes in mixed IR forest 913. The translator then performs target specific optimizations in step 916 on the target ASNs in the mixed IR forest 913. Finally, code generation invokes the implementation component of each node in the mixed tree (both base nodes and target ASN nodes have implementation components) in step 917, which then generates target code 919.

In the special case of a code accelerator, the subject and target architectures are both the same. In this scenario, subject ASNs persist throughout translation. In the frontend 31, decoding generates subject ASNs from the subject instructions. In the kernel 32, the subject ASNs are passed through architecture specific optimizations. Code generation invokes the subject ASNs' implementation components to generate the corresponding instructions. As such, in a code accelerator the use of ASNs prevents code explosion, by ensuring a minimum subject to target instruction conversion ratio of 1:1, which can be increased by optimizations.

The various embodiments of the translator of the present invention can be configured for specific translator applications (i.e., particular subject architecture target architecture pairs). As such, the translator of the present invention is configurable to convert subject code designed to run on any subject architecture to target code executable on any target architecture. Across multiple translator applications, each base node has multiple implementation components, one for each supported target architecture. The particular configuration being undertaken (i.e., conditional compilation) determines which IR nodes and which components of those nodes to include in a particular translator application.

The use of ASNs in a preferred embodiment of the present invention provides a plurality of advantageous benefits. First, a translator product built from scratch can be developed quickly using generic IR implementations of subject instructions. Second, existing translator products can be incrementally augmented, by implementing target specific conversion components for subject instructions that are critical to performance (as known beforehand or as empirically determined). Third, as more translator products are developed, the library of ASN nodes (and implemented functionality) grows over time, so future translator products can be implemented or optimized quickly.

This embodiment of the present invention backend implementations to pick and choose which subject instructions are worth optimizing (by defining target-specialized conversion components). The generic conversion component allows an ASN-based translator to be developed quickly, while the specialized conversion components allows performance critical instructions to be selectively and incrementally optimized.

Example 3

Difficult Instructions Using ASN

Returning to the PowerPC SHL64 instruction of Example 2 above, the translator 30 using ASNs performs the following steps. The frontend decoder 200 decodes the current block and encounters the PowerPC SHL64 instruction. The frontend 31 then realizes a single ASN for that instruction, SHL64 PPC P4. The kernel 32 then optimizes the IR for the current block of instructions and performs an in-order traversal of the IR in preparation for code generation. The kernel 32 then performs code generation for the ASN nodes by invoking each particular ASN node's code generator function, which is an element of the implementation component. The backend 33 then encodes subject architecture (PPC) instructions into one or more target architecture (P4) instructions.

MIPS Examples

Figure 10:
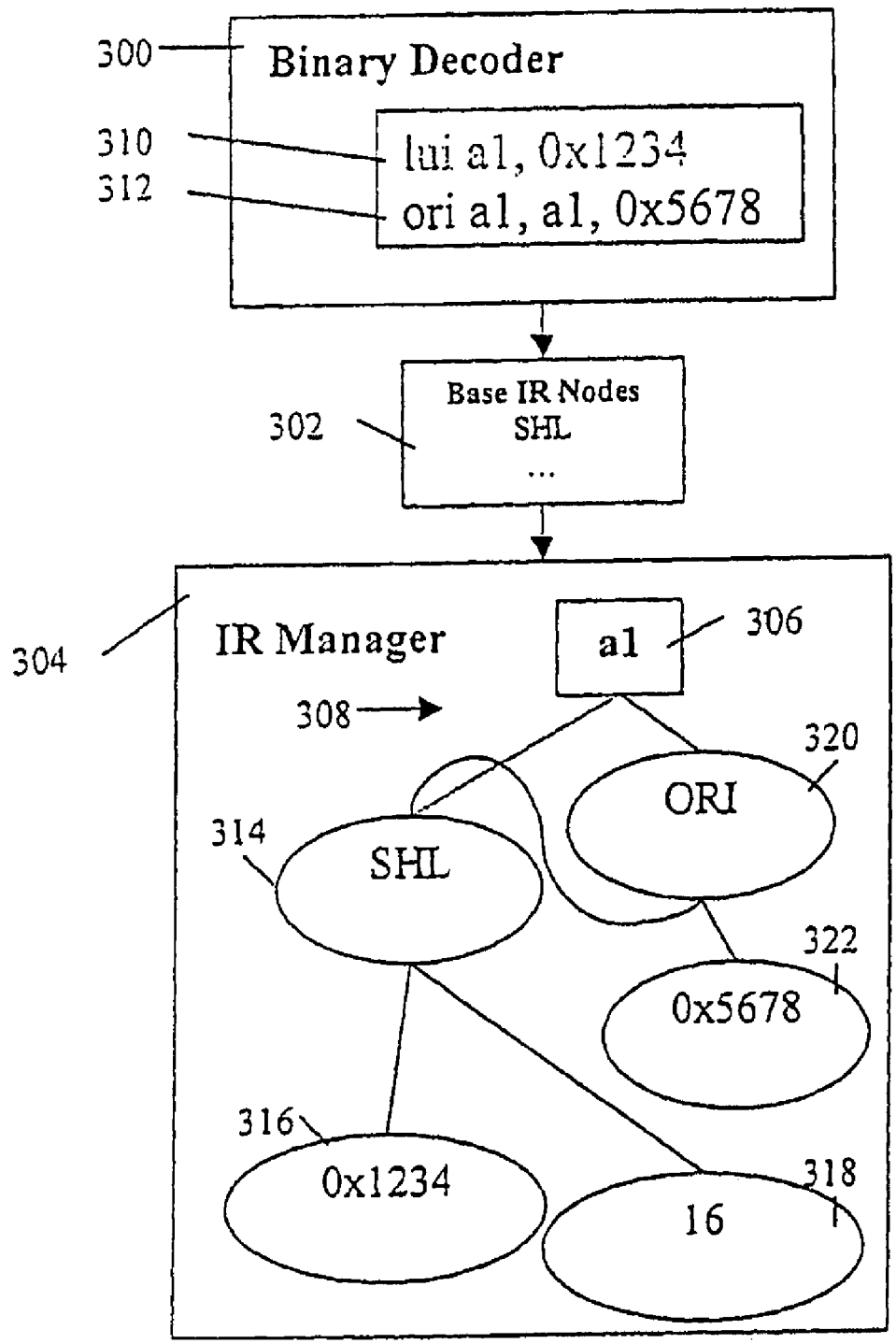
FIG. 10 is a schematic diagram illustrating an example of a translation process and corresponding IR generated during the process.
Figure 11:
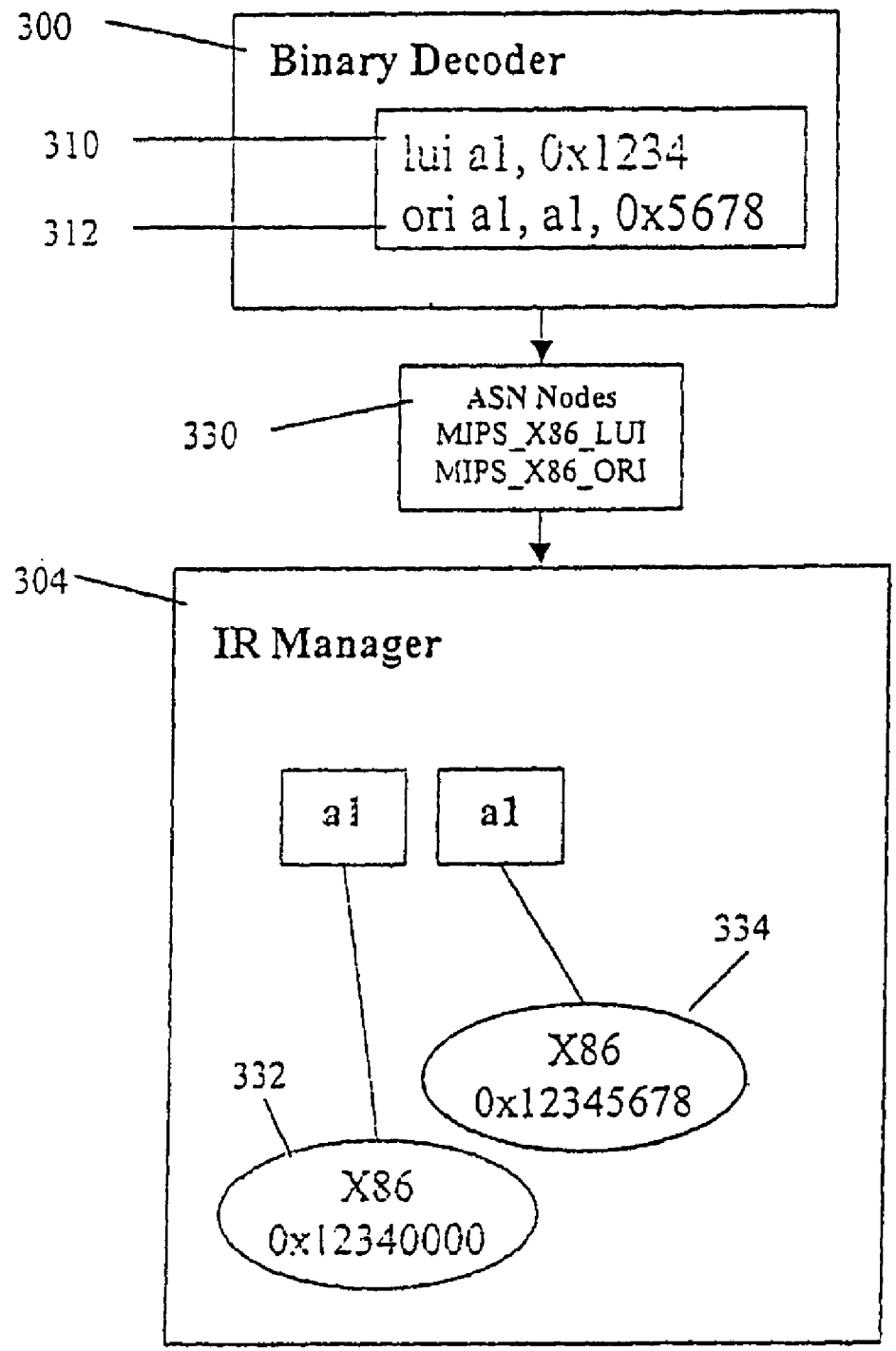
FIG. 11 is a schematic diagram illustrating another example of a translation process and corresponding IR generated during the process.
Figure 12:
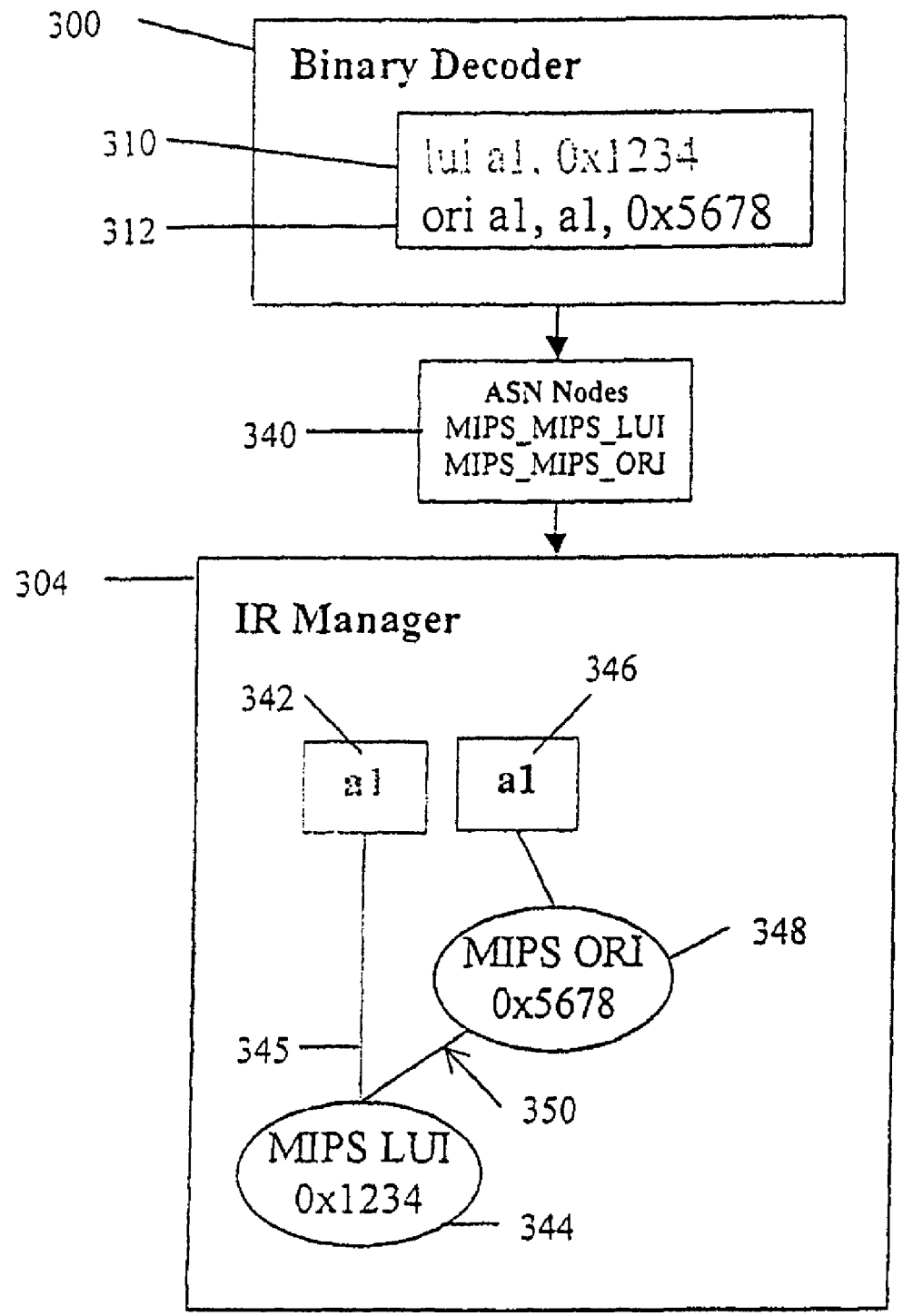
FIG. 12 is a schematic diagram illustrating a further example of a translation process and corresponding IR generated during the process.

Referring now to FIGS. 10, 11 and 12, examples illustrating the different IR trees that are generated from the same MIPS instruction sequence using base IR nodes, MIPS-MIPS ASN IR nodes, and MIPS-X86 ASN IR nodes, respectively, are shown. The semantics of the example MIPS subject instruction sequence (load upper immediate, then bitwise-or immediate) is to load the 32 bit constant value 0x12345678 into subject register "a1".

In FIG. 10, the Binary Decoder 300 is a frontend 31 component of the translator 30 which decodes (parses) the subject code into individual subject instructions. After the subject instructions are decoded, they are realized as base nodes 302 and added to the working IR forest for the current block of instructions. The IR Manager 304 is the portion of the translator 30 that holds the working IR forest during IR generation. The IR Manager 304 consists of abstract registers and their associated IR trees (the roots of the IR forest are abstract registers). For example, in FIG. 10, the abstract register "a1" 306 is the root of an IR tree 308 of five nodes, which is part of the current block's working IR forest. In a translator 30 implemented in C++, the IR Manager 304 may be implemented as a C++ object that includes a set of abstract register objects (or references to IR node objects).

FIG. 10 illustrates an IR tree 308 generated by a MIPS to X86 translator using base nodes only. The MIPS_LUI instruction 310 realizes a "SHL" (shift left) base node 314 with two operand nodes 316 and 318, which in this case are both constants. The semantics of the MIPS_LUI instruction 310 are to shift a constant value (0x1234) left by a constant number of bits (16). The MIPS_ORI instruction 312 realizes an "ORI" (bitwise-or immediate) base node 320 with two operand nodes 314 and 322, the result of the SHL node 314 and a constant value. The semantics of the MIPS_ORI instruction 312 are to perform a bitwise-or of the existing register contents with a constant value (0x5678).

In an unoptimized code generator, the base nodes include no immediate-type operators other than load immediate, so each constant node results in the generation of a load-immediate instruction. The unoptimized base node translator therefore requires five RISC type operations (load, load, shift, load, or) for this subject instructions sequence. Backend 33 idiom recognition can reduce this number from five to two, by coalescing the constant nodes with their parent nodes, to generate immediate type target instructions (i.e., shift immediate and or immediate). This reduces the number of target instructions to two, but for an increased translation cost in performing the idiom recognition in the code generator.

Using complex nodes in the IR can realize immediate type IR nodes, which eliminates the need to perform idiom recognition in the backend 33 and reduces the translation cost of the code generator. Complex nodes preserve more of the semantics of the original subject instructions, and, with fewer IR nodes being realized, the translation cost of node generation is also reduced when using complex nodes.

FIG. 11 illustrates the IR tree generated by a MIPS-X86 (MIPS to X86) translator using ASNs. After the subject instructions are decoded by the binary decoder 300, they are realized as MIPS_X86 ASN nodes 330, which are then added to the working IR forest for the current block. First, the MIPS_X86_LUI ASN node is converted into an X86 32-bit constant node 332 by the ASN's convert component. Second, the MIPS_X86_ORI ASN node produces an X86 ORI node which is immediately folded with the previous X86 constant node (constant folding), resulting in a single X86 32-bit constant node 334. This node 334 is encoded into a single X86 load constant instruction, "mov % eax, $0x12345678". As can be seen, ASN nodes result in fewer nodes than the base node example, thus reducing translation cost and providing better target code.

FIG. 12 illustrates an IR tree generated by a MIPS-MIPS translator (i.e., a MIPS accelerator) using ASNs. After the subject instructions 310, 312 are decoded by the binary decoder 300, they are realized as MIPS-MIPS ASN nodes 340, which are then added to the working IR forest for the current block. Because the source and target architectures are the same for the MIPS-MIPS translator, the MIPS_MIPS_LUI and MIPS_MIPS_ORI ASN nodes 340 have null (undefined) convert components. As such, there is a direct correspondence between the subject instructions and the final IR nodes used to generate code. This guarantees a 1:1 subject to target instruction translation ratio, even before any optimizations are applied. In other words, ASN nodes eliminate code explosion for same-same translators (accelerators). ASN nodes also allow 16 bit constant nodes to be shared, which is useful for efficient translation of contiguous memory accesses on the MIPS platform.

Basic blocks of instructions are translated one subject instruction at a time. Each subject instruction results in the formation of (realizes) an IR tree. After the IR tree for a given instruction is created, it is then integrated into the working IR forest for the current block. The roots of the working IR forest are abstract registers, which correspond to the subject registers and other features of the subject architecture. When the last subject instruction has been decoded, realized, and its IR tree integrated with the working IR forest, the IR forest for that block is complete.

In FIG. 12, the first subject instruction 310 is "lui a1, 0x1234". The semantics of this instruction 310 are to load the constant value 0x1234 into the upper 16 bits of subject register "a1" 342. This instruction 310 realizes a MIPS_MIPS_LUI node 344, with an immediate field constant value of 0x 1234. The translator adds this node to the working IR forest by setting abstract register "a1" 342 (the destination register of the subject instruction) to point to the MIPS_MIPS_LUI IR node 344.

In the same example in FIG. 12, the second subject instruction 312 is "ori a1, a1, 0x5678". The semantics of this instruction 312 are to perform a bitwise-or of the constant value 0x5678 with the current contents of subject register "a1" 342 and to store the result in subject register "a1" 346. This instruction 312 realizes a MIPS_MIPS_ORI node 348, with an immediate field constant value of 0x5678. The translator adds this node to the working IR forest by first setting the ORI node to point to the IR tree that is currently pointed to by abstract register "a1" 342 (the source register of the subject instruction), and then setting the abstract register "a1" 346 (the destination register of the subject instruction) to point to the ORI node 348. In other words, the existing "a1" tree rooted with abstract register 342 (i.e., the LUI node) becomes a subtree 350 of the ORI node 348, and then the ORI node 348 becomes the new a1 tree. The old "a1" tree (after LUI but before ORI) is rooted from abstract register 342 and shown as linked by line 345, while the current "a1" tree (after ORI) is rooted from abstract register 346.

As can be seen from the foregoing, an improved program code conversion apparatus formed in accordance with the present invention is configurable to any subject and target processor architecture pairing while maintaining an optimal level of performance and balancing the speed of translation with the efficiency of the translated target code. Moreover, depending upon the particular architectures of the subject and target computing environments involved in the conversion, the program code conversion apparatus of the present invention, can be designed with a hybrid design of generic and specific conversion features by utilizing a combination of base nodes, complex nodes, polymorphic nodes, and architecture specific nodes in its intermediate representation.

The different structures of the improved program code conversion apparatus of the present invention are described separately in each of the above embodiments. However, it is the full intention of the inventors of the present invention that the separate aspects of each embodiment described herein may be combined with the other embodiments described herein. For instance, the translator formed in accordance with the present invention may comprise hybrid optimizations of various IR types.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of translating subject code of a subject architecture into target code of a target architecture, comprising the computer-implemented process of:
   decoding the subject code and generating an intermediate representation including a plurality of subject architecture specific nodes which are specific to the subject architecture;
   converting the subject architecture specific nodes into target architecture specific nodes which are specific to the target architecture by invoking a conversion component of the subject architecture specific nodes; and
   generating target code from the intermediate representation including generating target code instructions from the target architecture specific nodes.

2. The method of claim 1, wherein at least one of the subject architecture specific nodes comprises a specialised conversion component which generates one or more corresponding target architecture specific nodes, wherein the specialised conversion component is specific to a subject architecture target architecture pair.

3. The method of claim 1, wherein at least one of the target architecture specific nodes comprises an implementation component which is invoked to generate a target code instruction from the target architecture specific node.

4. The method of claim 1, wherein each of the plurality of subject architecture specific nodes is associated with a respective instruction type in the subject architecture.

5. The method of claim 1, wherein each of the target architecture specific nodes is associated with a particular instruction type in the target architecture.

6. The method of claim 1, wherein generating target code comprises generating one target code instruction from each respective target architecture specific node.

7. The method of claim 2, wherein at least one of the plurality of subject architecture specific nodes further comprises a data component representing semantics of a respective subject code instruction.

8. The method of claim 3, wherein at least one of the target architecture specific instructions further comprises a data component representing semantics of a respective target code instruction.

9. The method of claim 1, wherein the step of generating an intermediate representation further includes generating at least one base node which is generic to the subject architecture and the target architecture.

10. The method of claim 1, wherein:
converting further comprises converting at least one of the subject architecture specific nodes into one or more base nodes which are generic to the subject architecture and the target architecture; and
generating the target code further comprises generating target code instructions from the one or more base nodes.

11. The method of claim 10, wherein the at least one of the subject architecture specific nodes comprises a generic conversion component which generates the one or more base node.

12. The method of claim 1, further comprising the step of performing subject architecture specific optimisations of the plurality of subject architecture specific nodes.

13. The method of claim 1, further comprising the step of performing target architecture specific optimisations of the target architecture specific nodes.

14. A non-transitory computer readable storage medium having translator software resident thereon in the form of computer readable code executable by a computer to perform the process of:
decoding the subject code and generating an intermediate representation including a plurality of subject architecture specific nodes which are specific to the subject architecture;
converting the subject architecture specific nodes into target architecture specific nodes which are specific to the target architecture by invoking a conversion component of the subject architecture specific nodes; and
generating target code from the intermediate representation including generating target code instructions from the target architecture specific nodes.

15. A translator apparatus for use in a target computing environment having a processor and a memory coupled to the processor for translating subject code capable of being executed on a subject architecture to target program code capable of being executed on the target architecture of the target computing environment using the translator apparatus, wherein the translator apparatus comprises:
a decoder unit arranged to decode the subject code and generate an intermediate representation including a plurality of subject architecture specific nodes which are specific to the subject architecture;
a converter unit arranged to convert the subject architecture specific nodes into target architecture specific nodes which are specific to the target architecture by invoking a conversion component of the subject architecture specific nodes; and
a generator unit arranged to generate target code from the intermediate representation including generating target code instructions from the target architecture specific nodes.

* * * * *